July 13, 1965　　　　G. SPINOSA　　　　3,194,185
PIE DOUGH ROLLING AND MIXING BAG
Filed July 26, 1962　　　　　　　　　　3 Sheets-Sheet 1
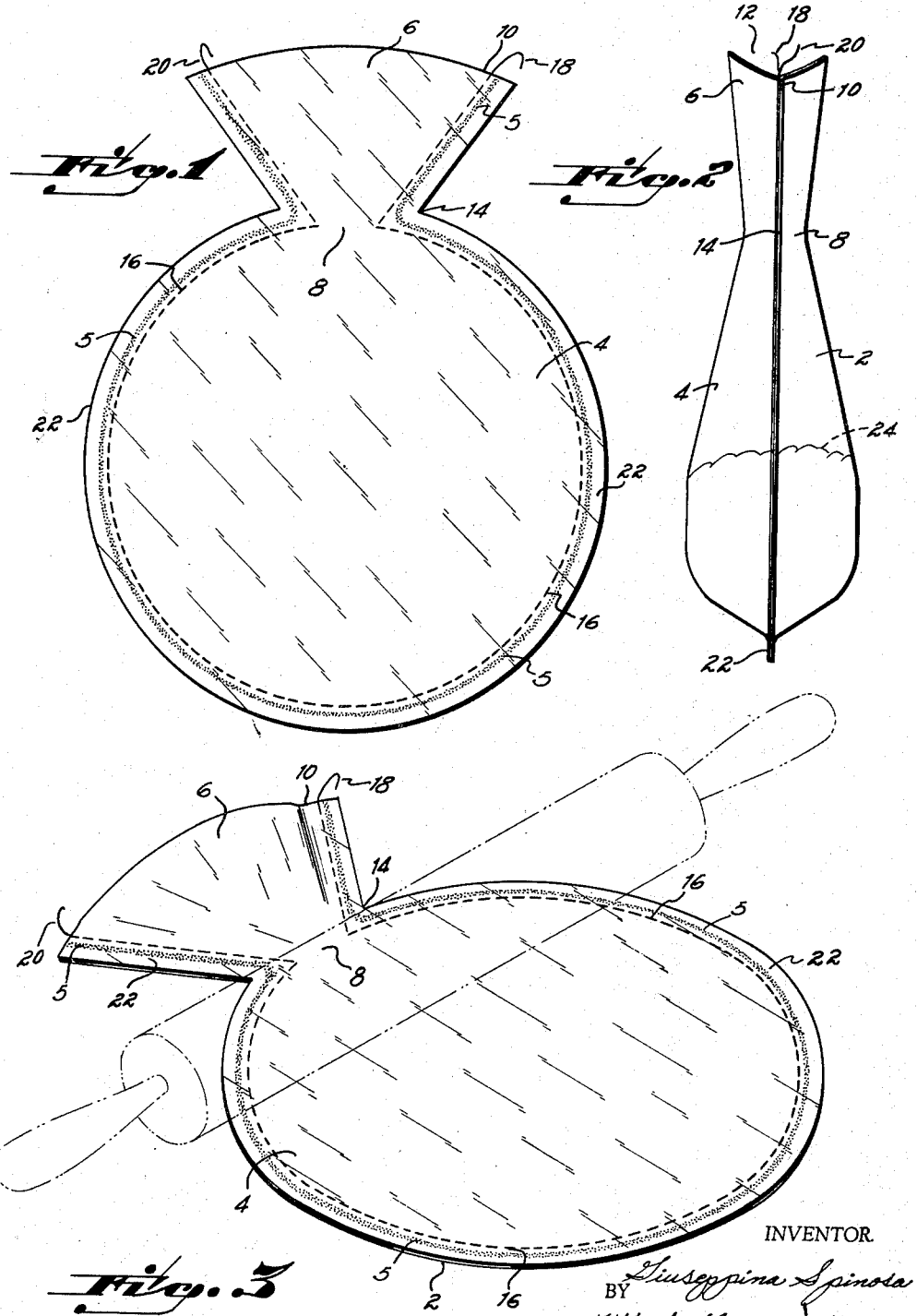
INVENTOR.
BY Giuseppina Spinosa
Wood, Herron & Evans
ATTORNEYS July 13, 1965  G. SPINOSA  3,194,185
PIE DOUGH ROLLING AND MIXING BAG
Filed July 26, 1962  3 Sheets-Sheet 2

INVENTOR.
BY Giuseppina Spinosa
Wood, Herron & Evans
ATTORNEYS

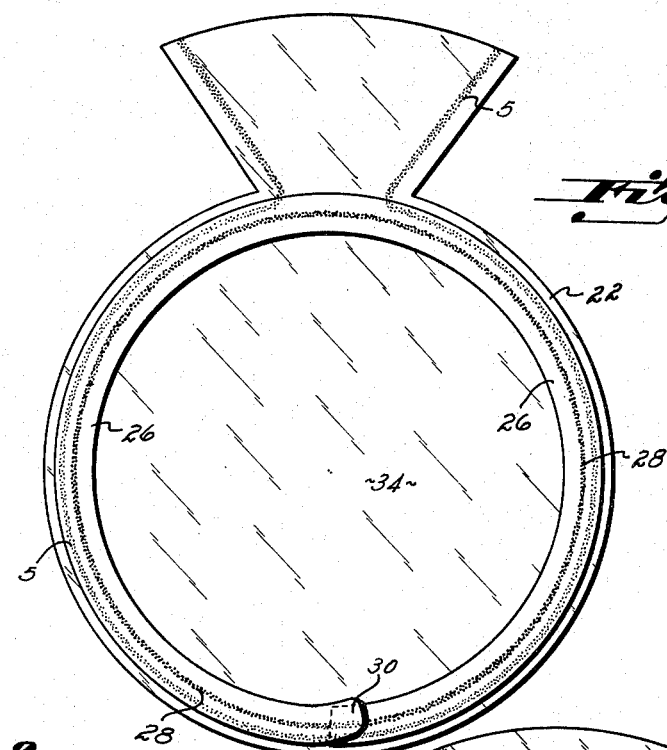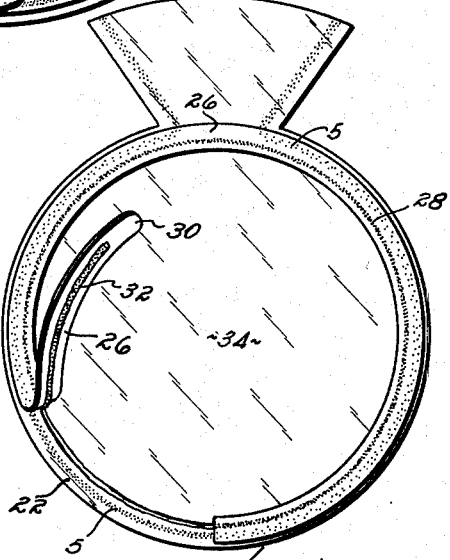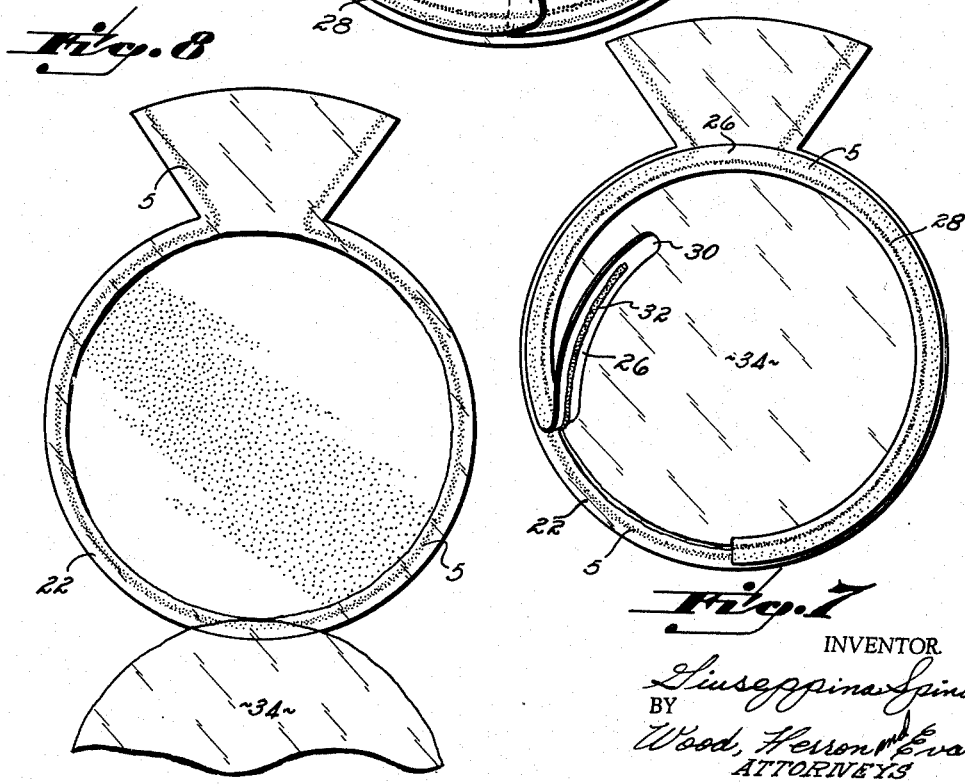

3,194,185
PIE DOUGH ROLLING AND MIXING BAG
Giuseppina Spinosa, Cincinnati, Ohio, assignor of
one-half to Milena C. Lodico
Filed July 26, 1962, Ser. No. 212,520
3 Claims. (Cl. 107—54)

This invention relates to household labor saving devices and more particularly to a labor saving device for facilitating the production of pie dough including pizza dough.

As is recognized by every housewife, the making of a pie is a time consuming and laborious procedure because of the difficulties and problems involved in mixing and rolling the pie dough. This mixing and rolling procedure requires several pans and a rolling board which must all be washed after the pie is made. In addition, the light flour and other ingredients in the pie dough mix are usually difficult to handle and result in flour being strewn all over the kitchen before the pie is completed. As a result, the making of a pie is a messy process at best which requires a great deal of cleaning effort after the pie is made.

It has been an objective of this invention to provide an improved method of making pie dough which eliminates all of the cleaning effort heretofore inherent in the mixing and rolling of pie dough.

Another objective of this invention has been to provide an inexpensive pie dough mixing and rolling bag which may be used to mix and shape dough and thereafter disposed of so so as to eliminate all of the cleaning effort usually associated with the production of a homemade pie.

Another objective of this invention has been to provide a pie dough mixing and rolling bag in which the ingredients may easily be inserted through an opening on one side of the bag.

Yet another objective of this invention has been to provide a two ply thin transparent bag which has opening means around the edge of the bag so located that the two plies may be easily separated after pie dough has been mixed and rolled out into the desired shape within the bag.

These and other objects of this invention will be readily apparent from a description of the drawings in which:

FIGURE 1 is a front elevational view of the mixing bag of this invention,

FIGURE 2 is a side elevational view of the bag with the pie dough mix therein,

Figure 4:
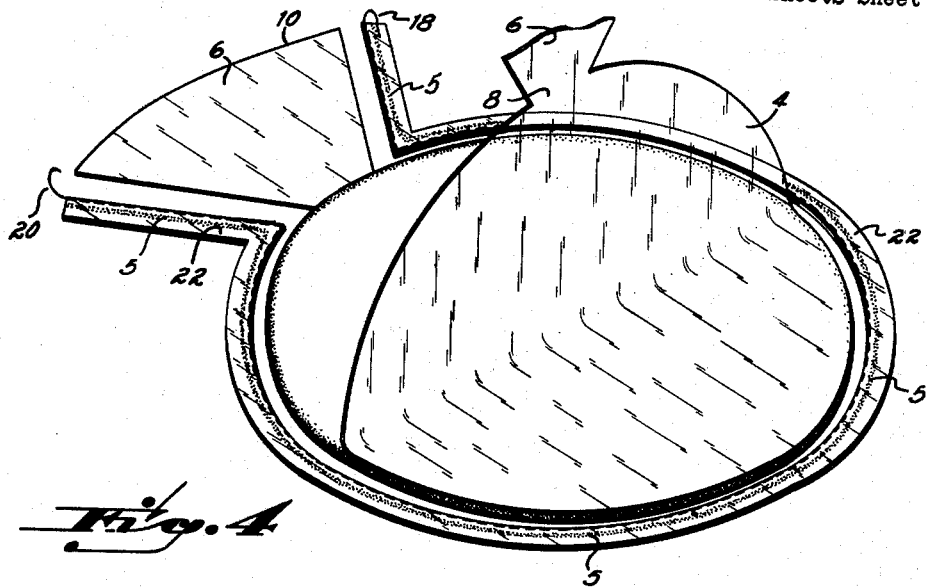
Figure 3:
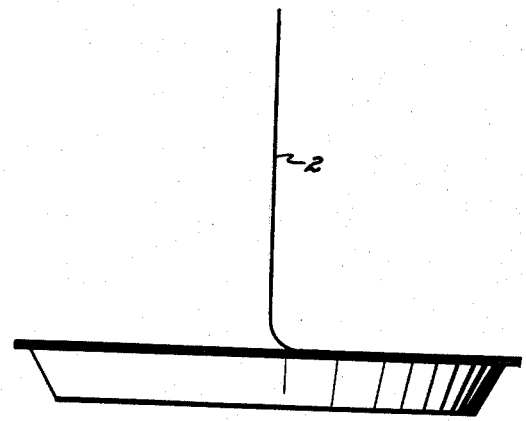

FIGURE 3 is a perspective view of the bag showing the manner in which the pie dough is rolled therein, FIGURE 4 is a perspective view of the bag after the edge has been separated along the tear line showing the manner of removal of the first ply, FIGURE 5 is a side elevational view of a pie pan having the dough therein and showing the manner of removal of the second ply of the bag from the dough, FIGURE 6 is a front elevational view of a second embodiment of the pie dough mixing and rolling bag of this invention, FIGURE 7 is a front elevational view of the device of FIGURE 6 showing the manner of separation of the two plies of the device, FIGURE 8 is a front elevational view of the device of FIGURE 6 with the two plies separated.

Referring to the drawings, it will be seen that the device of this invention consists of two plies, 2 and 4, which are heat sealed together at 5 around their lateral edges to form a bag. As clearly shown in FIGURE 1, the plies are generally circular in shape although they may be of any shape or contour depending upon the shape of the pan with which the dough mixed within the bag is intended to be used. The plies are made from a thin transparent sheet material such as polyethylene and in the illustrated embodiments are generally circular in shape with a funnel shaped tab portion 6 extending laterally from one side. The superposed plies of the bag are sealed together at their lateral edges nearly all of the way around the periphery of the bag. However at the point adjacent the tab portion 6, the two plies are unsealed so that an opening 8 is formed at this point. The seal extends laterally outwardly from the opening 8 to the edge 10 of the tab portion so that the seal forms a diverging opening 12 into the bag. Thus when the bag is grasped around the neck or smaller portion 14 of the tab portion, and squeezed slightly the tab portion forms a funnel shaped opening into the center of the bag. The solid and liquid ingredients of the dough mix are intended to be inserted through the funnel shaped opening so that they can be mixed within the bag. If desired, a disposable funnel shaped member may be inserted into the funnel shaped opening of the bag so as to rigidify this section. Such a rigidifying member is desirable when mixing pizza pie dough where a large amount of water is required in the mix.

For purposes of separating the two plies of the bag after dough has been mixed and shaped therein, the embodiment of FIGURE 1 has two plies sewed together along the inside edge 16 of the heat sealed portion of the bag 1. By use of a lock stitch, a satisfactory tear line is imported to the bag. At the ends 18 and 20 of the stitching 16, the threads are left to extend beyond the edge of the bag so as to form a convenient grasping medium by which the thread may be grasped and pulled to tear the lateral heat sealed edge portion 22 of the bag away from the central portion so as to separate the two plies of the bag. While both ends 18 and 20 of the thread have been shown as extending beyond the edge of the bag, only one thread need be left in order to facilitate tearing in this manner.

After the pie has been mixed within the bag, it is then rolled within the bag as shown in FIGURE 3 so that the shape of the bag is imparted to the pie dough. The two plies of the bag are then separated by pulling upon one end 18 or 20 of the stitching so as to pull the heat sealed edge portion 22 of the bag away from the central portion of the separate plies of the bag as illustrated in FIGURE 4. The shape pie dough can then be removed without destroying the shape into which it has been previously rolled.

In FIGURES 6 and 7 wherein is illustrated a second embodiment of this invention, similar numerals have been used to designate similar structure. This embodiment differs from that illustrated in FIGURES 1–5 principally in the manner in which the plies of the bag are separated so as to expose the rolled dough. A circular tear member or tape 26 is glued or heat sealed to one outer side of the bag along a thin ridge section 28 which extends around the inner edge of the heat sealed portion 22 of the bag. In order to grasp the tape so as to pull it away from the bag after the dough has been rolled therein, a loose tab 30 is provided at one end. The tape 26 as well as the glued or heat sealed section 28 is of greater strength than the polyethylene material of which the bag is made so that as the tape is pulled off of the side of the bag, it pulls away a thin section or strip 32 of the bag as shown in FIGURE 7 so as to separate the middle section 34 of the side or ply of the bag to which the tape is attached from the outer heat sealed portion 22. After the tape has been pulled away or removed, the middle section of the bag is removed as shown in FIGURE 8 so as to expose one side of the rolled pie dough.

The manner of using the device of this invention should now be readily obvious. The ingredients for the pie or pastry dough are poured into the bag through the funnel shaped opening 12. Since pie dough mix is now available in a ready mixed form to which only water need be added, the mixed ingredients may be poured into the bag along with the proper amount of water as illustrated in FIGURE 2. The ingredients are then mixed together within the bag by kneading the exterior of the bag until the dough reaches the proper consistency at which time the bag is placed upon a table and rolled out into the shape of the bag as shown in FIGURE 3. Since the pie dough ingredients 24 are all initially at the bottom of the bag or the side opposite the opening 12 when the rolling operation is started, the dough is rolled from the bottom toward the opening 8 in the central portion of the bag. Therefore any excess dough within the bag will be forced through the opening 8 provided by the gap between the sewed edge 16 around the side of the bag. Since the bag is transparent, it will be obvious to a person using the bag when the dough has been rolled out into a properly shaped sheet of dough. With the dough properly shaped within the bag, the person using this device need only pull upon the thread end 18 or the tape end 30 to separate the sealed portion of the bag, from at least one middle section of the bag. At this time, the upper ply of the rolling and shaping device of this invention is pulled away as shown in FIGURE 4 or 8 to expose one side of the sheet of pie dough. The exposed side of the dough is then placed in the pie pan and the other ply is then removed as shown in FIGURE 5.

The advantages inherent in this invention should now be apparent. With this invention it is possible to make pie dough without dirtying numerous pans and without the housewife having to mix the dough by kneading it between her hands as has heretofore been conventional. Besides the fact that the pie dough made with this device is more sanitary and much cleaner than has heretofore been possible, the dough is also much more even in consistency and produces much less waste. In addition, this device substantially reduces the time necessary to make pie dough for homemade pies.

Another important advantage which results from the use of this device is derived from the heat insulating properties of the polyethylene material of which the device is made. Conventional pie dough is usually made with ice water which imparts to the dough a flaky quality. By using the device of this invention to mix the dough, the heat from the hands is insulated from the dough so that the dough mixed within the bag is superior to that mixed or kneaded in the usual manner by hand. This same property is also useful in the making of pizza pie dough in which hot water and yeast are added to the mix. In this case, the bag prevents the dough from cooling as it is kneaded or worked and while it rises.

Having described my invention, I claim:

1. The method of preparing pastry dough for baking which consists of,
    placing the dough ingredients within a flat flexible bag,
    mixing said ingredients within said bag,
    rolling said dough within said bag into a sheet of the same general shape as that of said bag, and
    removing said bag to expose the shaped sheet of dough.

2. The method of preparing pastry dough for baking which consists of,
    placing the ingredients within a flat flexible bag,
    mixing said ingredients within said bag,
    rolling said dough within said bag into a sheet of the same shape as that of said bag,
    removing one side of said bag to expose one side of said sheet of dough,
    placing said sheet of dough within a baking pan, and removing the other side of said bag.

3. The method of preparing pastry dough for baking which consists of,
    placing the dough ingredients within a flat flexible bag,
    mixing said ingredients within said bag,
    rolling said dough within said bag into a sheet of the same general shape as that of said bag,
    removing a marginal sealed portion of said bag,
    removing one side of said bag to expose one side of said sheet of dough,
    placing said sheet of dough within a baking pan, and removing the other side of said bag.

References Cited by the Examiner
UNITED STATES PATENTS

| | | | |
|---|---|---|---|
| 1,134,329 | 4/15 | Gordon | 107—54 |
| 1,144,953 | 6/15 | Ward | 107—54 |
| 1,185,767 | 6/16 | Cather | 229—68 |
| 1,448,104 | 3/23 | Aumiller | 229—68 |
| 1,873,716 | 8/32 | Nickerson | 53—21 |
| 2,625,893 | 1/53 | Semple | 99—92 X |
| 2,745,754 | 5/56 | Steinbock | 99—171 |

ROBERT E. PULFREY, *Primary Examiner.*

JOSEPH D. BEIN, *Examiner.*